(12) United States Patent
Rawlings et al.

(10) Patent No.: US 6,411,487 B1
(45) Date of Patent: Jun. 25, 2002

(54) COAXIAL SURGE PROTECTOR HAVING THERMAL FAIL-SAFE SHUNT

(75) Inventors: David L. Rawlings, Bayville; Prem G. Chandran, Nesconset; Israel Moskovitch, Bronx, all of NY (US)

(73) Assignee: Porta Systems Corp., Syosset, NY (US)

( * ) Notice: Subject to any disclaimer, the term of this patent is extended or adjusted under 35 U.S.C. 154(b) by 0 days.

(21) Appl. No.: 09/484,072

(22) Filed: Jan. 18, 2000

Related U.S. Application Data

(63) Continuation-in-part of application No. 09/089,535, filed on Jun. 3, 1998, now abandoned.
(60) Provisional application No. 60/048,447, filed on Jun. 3, 1997.

(51) Int. Cl.[7] .................................................. H02H 1/00
(52) U.S. Cl. ....................... 361/124; 361/119; 361/107; 361/103; 337/16
(58) Field of Search .................... 361/54, 56, 103–106, 361/111, 113, 107, 119, 124; 337/14, 15, 16, 17

(56) References Cited

U.S. PATENT DOCUMENTS

| | | |
|---|---|---|
| 4,509,090 A | 4/1985 | Kawanami et al. |
| 4,544,984 A | 10/1985 | Kawanami et al. |
| 4,633,359 A | 12/1986 | Mickelson et al. |
| 4,729,055 A | 3/1988 | Dorival et al. |
| 4,918,565 A | 4/1990 | King |
| 5,122,921 A | 6/1992 | Koss |
| 5,247,273 A | 9/1993 | Shibayama et al. |
| 5,657,196 A | 8/1997 | Chaudhry et al. |

Primary Examiner—Kim Huynh
(74) Attorney, Agent, or Firm—Hoffman & Baron, LLP

(57) ABSTRACT

A coaxial surge protector includes a housing in which is situated a transmission line in the form of a two-sided printed circuit board. The surge protector includes input and output signal connectors mounted on a housing and connected to the transmission line, and a gas discharge tube electrically coupled between the transmission line and circuit ground. A thermally activated shunt assembly is thermally coupled to the gas discharge tube and senses when the gas discharge tube is in an overheating condition. Upon such condition, the shunt assembly provides an electrically conductive shunt in parallel with the gas discharge tube to divert current flowing through the gas discharge tube to flow through the shunt assembly to ground in order to minimize further overheating of the gas discharge tube.

2 Claims, 7 Drawing Sheets

23

COAXIAL SURGE PROTECTOR HAVING THERMAL FAIL-SAFE SHUNT

This application is a continuation-in-part of U.S. application Ser. No. 09/089,535, filed Jun. 3, 1998, now abandoned which claims the benefit of U.S. provisional patent application Ser. No. 60/048,447, filed Jun. 3, 1997, entitled "Coaxial Surge Protector Having Thermal Fail-Safe Shunt."

BACKGROUND OF THE INVENTION

1. Field of the Invention

The present invention relates generally to surge suppressor circuits for electrical equipment and more particularly relates to a surge suppressor circuit having a thermally activated fail-safe shunting device.

2. Description of the Prior Art

Surge suppressor circuits for protecting sensitive electronic equipment are well known in the prior art. These circuits typically present a high impedance (open circuit) to circuit ground under normal signal conditions and present a low impedance (short circuit) to circuit ground when a voltage or a current exceeds a predetermined threshold. For momentary voltage or current surges, such as lightning and noise spikes, the surge suppressor components are only activated for a short duration. In this condition, there is little thermal heating of the surge suppressing device typically used in such circuits. However, in those cases where a signal line being protected contacts a constant voltage supply line whose voltage exceeds the threshold voltage of the surge suppressor circuit, the surge suppressor continually conducts to circuit ground. This results in severe heating of the device. Absent thermal protection, this constant heating condition can result in a fire or in the failure of the surge suppressor.

OBJECTS AND SUMMARY OF THE INVENTION

It is an object of the present invention to provide a surge protector for electrical communication lines which substantially reduces overheating conditions in the surge protector.

It is another object of the present invention to provide a surge protector for electrical communication lines which can handle momentary voltage or current surges on the lines as well as a constant excessive voltage or current.

It is a further object of the present invention to provide a coaxial surge protection device for transmission lines which minimizes the chance of damage to the surge protector and failure thereof due to an overheating condition which may otherwise have led to damage of the electrical equipment to which the transmission line is connected.

It is still another object of the present invention to provide a coaxial surge suppressor circuit which overcomes the inherent disadvantages of conventional surge suppressors.

In a preferred form, the present invention provides a coaxial surge suppressor circuit with a thermally activated fail-safe shunting circuit. In accordance with one form of the present invention, a surge protector for electrical signal communication or transmission lines, such as for the transmission of data or telephony signals, includes a transmission line having associated therewith a circuit ground, and a surge suppressor element electrically coupled between the transmission line and circuit ground. A thermally activated shunt assembly is thermally coupled to the surge suppressor element. The thermally activated shunt assembly senses an overheating condition with respect to the surge suppressor element and electrically shunts the surge suppressor element upon sensing the overheating condition.

These and other objects, features and advantages present invention will become apparent from the following detailed description of illustrative embodiments thereof, which is to be read in connection with the accompanying drawings.

DETAILED DESCRIPTION OF THE PREFERRED EMBODIMENTS

Figure 1:
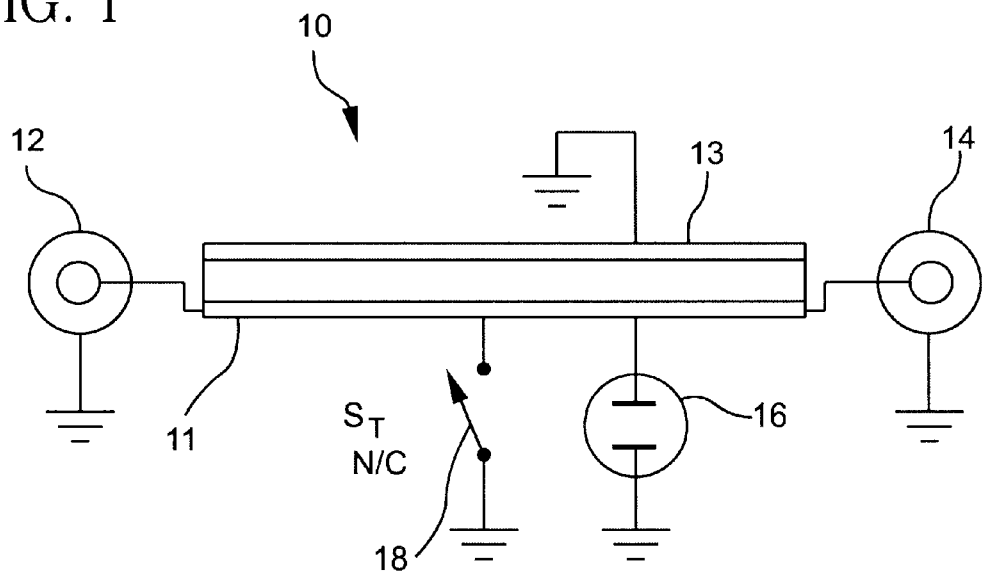
FIG. 1 is a schematic diagram of a coaxial surge protection circuit formed in accordance with the present invention.
Figure 2:
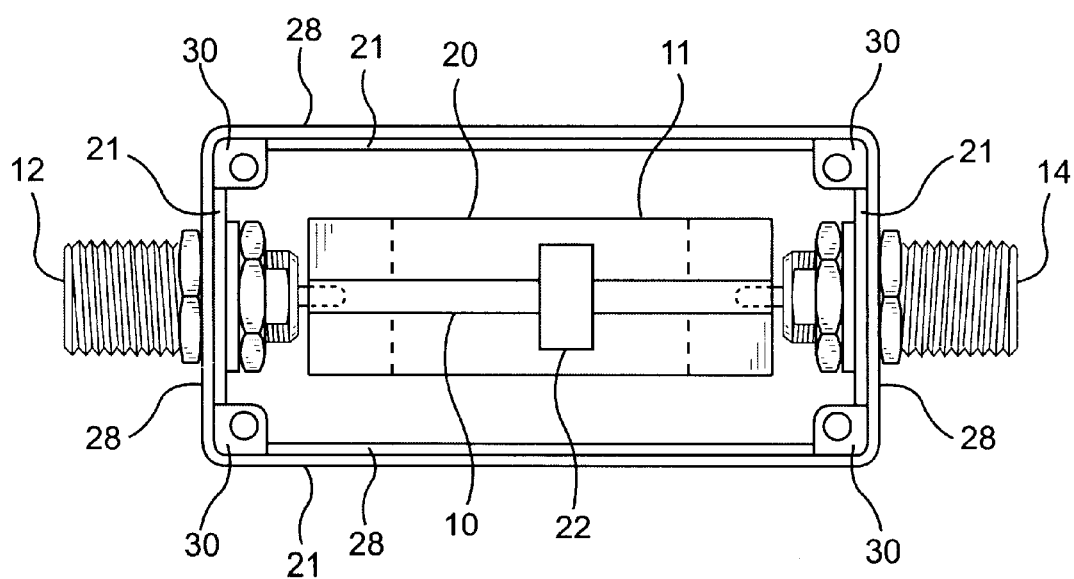
FIG. 2 is a top plan view of a partially assembled coaxial surge protection circuit formed in accordance with the present invention, illustrating a printed circuit board and a thermally removably engaged electrical insulating layer.

Referring to the drawings, FIG. 1 is a schematic diagram of a coaxial surge protection device formed in accordance with the present invention. The coaxial surge protector (CSP) includes a transmission line 10 electrically coupling a first connector 12 (for example, an input signal connector) and a second connector 14 (for example, an output signal connector) with a substantially constant, characteristic impedance, such as 75 ohms ($\Omega$). Preferably, the transmission line 10 is fabricated on a two-sided (copper-dielectric-copper) printed circuit board 20 (FIG. 2) using a microstrip topology in a manner well known in the art of radio frequency circuit design. As shown in FIGS. 1 and 2, one conductive side 11 of the printed circuit board 20 (i.e., microstrip transmission line) carries the signals being transmitted, and is connected to the center conductors of the input and output connectors 12, 14, and the other conductive side 13 of the printed circuit board 20 is connected to circuit ground.

The CSP further includes a surge suppressor element 16. While there are many surge suppressor elements known in the art, i.e., M.O.V.'s, transorbs and the like, gas discharge tubes are preferred for use in the present invention. Preferably, the surge suppressor element includes at least one gas discharge tube (GDT) 16 electrically coupled between the transmission line 10 and circuit ground. Under normal signal conditions, the GDT 16 is effectively an open circuit and provides only a minimal detuning of the transmission line 10. However, when a surge condition (i.e., voltage exceeding a predetermined threshold value, such as 230 volts) is presented on the transmission line 10, the GDT 16 presents a low impedance to circuit ground for that voltage which exceeds the threshold voltage of the GDT 16.

For momentary surges, such as lightning, the GDT 16 experiences only minimal thermal heating. However, in the case when a signal line being protected contacts a voltage supply line, the GDT 16 continually conducts. This results in the excessive heating of the GDT 16. To avert a potential fire hazard, an important aspect of the present invention is a thermally activated shunt 18. In the presence of a temperature exceeding a predetermined threshold, the shunt 18 preferably permanently electrically couples the transmission line 10 to circuit ground, thereby bypassing the GDT 16 in a fail-safe manner.

Figure 3:
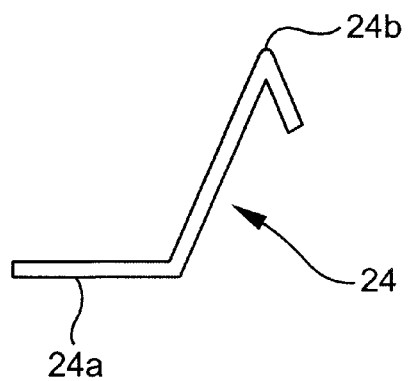
FIG. 3 is a cross-sectional view of a conductive shunt, formed in accordance with the present invention.
Figure 4:
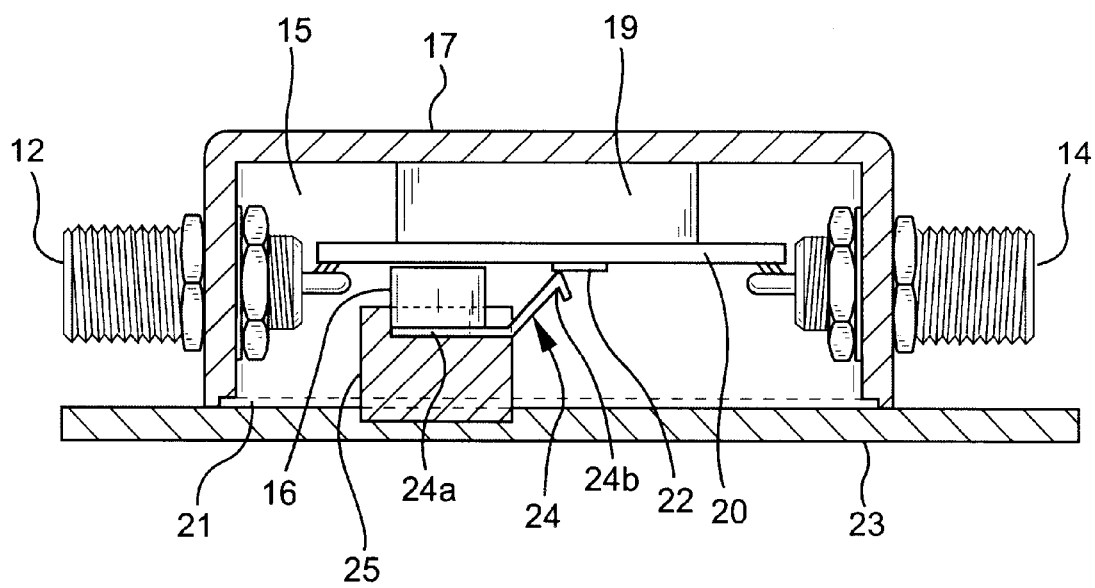
FIG. 4 is a cross-sectional view of a preferred embodiment of a coaxial surge protection circuit, formed in accordance with the present invention.
Figure 5:
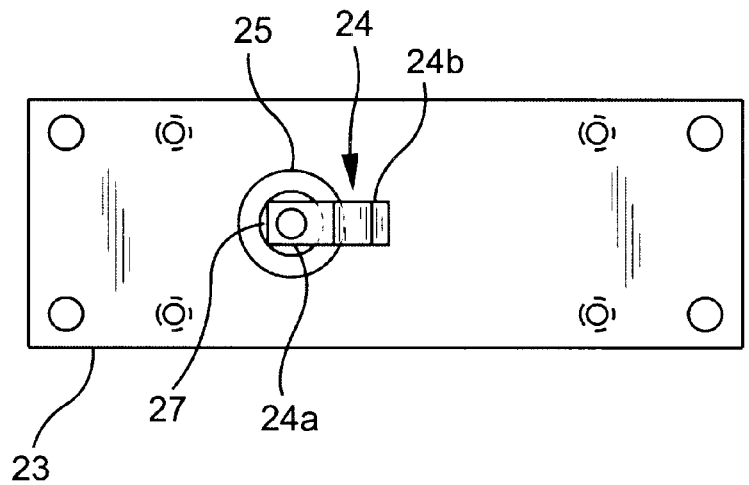
FIG. 5 is a top plan view of a base plate assembly including a spacer, gas discharge tube surge suppressor and shunt, formed in accordance with the present invention.
Figure 6:
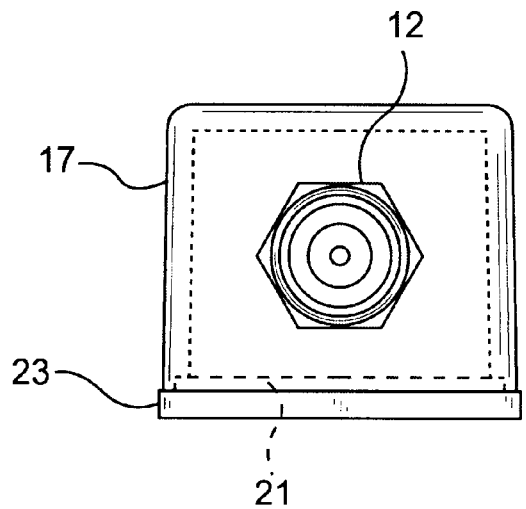
FIG. 6 is an end view of a coaxial surge protection circuit formed in accordance with the present invention.
Figure 7A:
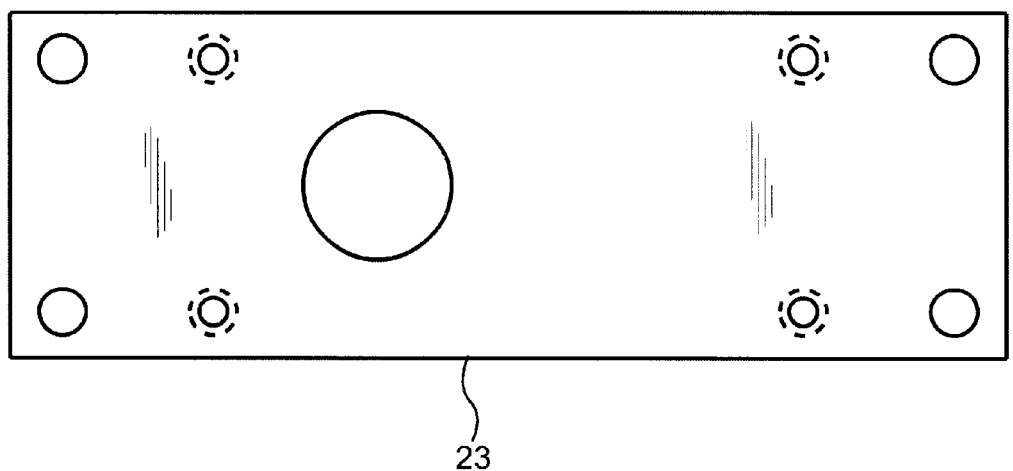
FIGS. 7a and 7b are top plan and cross-sectional views, respectively, of a base plate used to implement a preferred embodiment of the present invention.
Figure 7B:
Figure 8A:
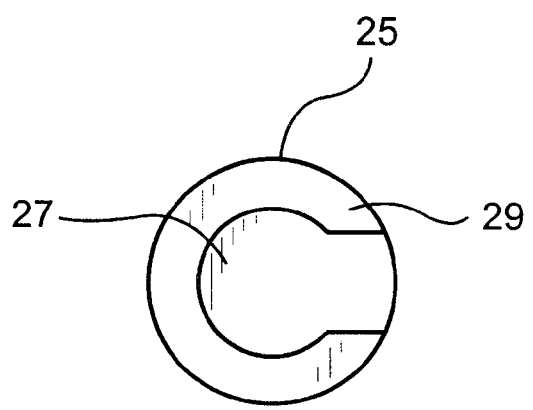
FIGS. 8a and 8b are top plan and cross-sectional views, respectively, of a spacer used to implement a preferred embodiment of the present invention.
Figure 8B:
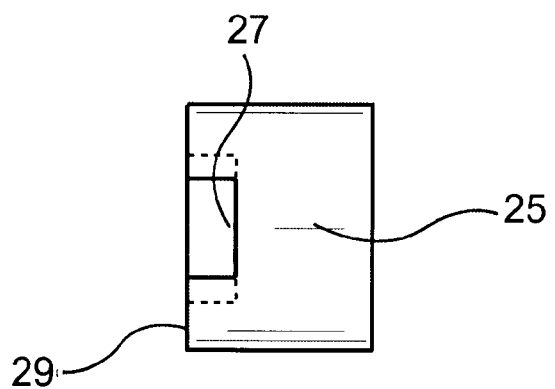
Figure 9A:
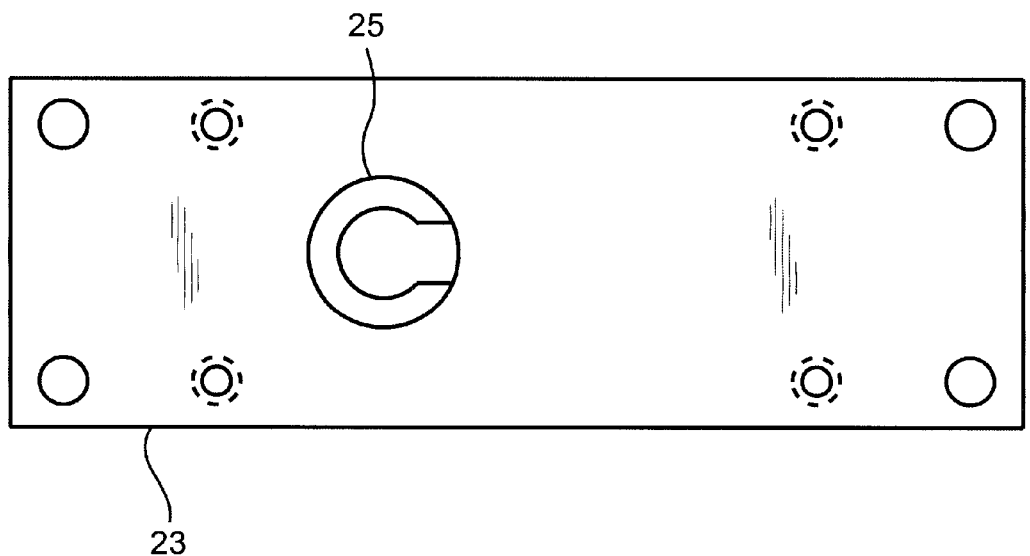
FIGS. 9a and 9b are top plan and cross-sectional views, respectively, of a base plate assembly used to implement a preferred embodiment of the present invention.
Figure 9B:
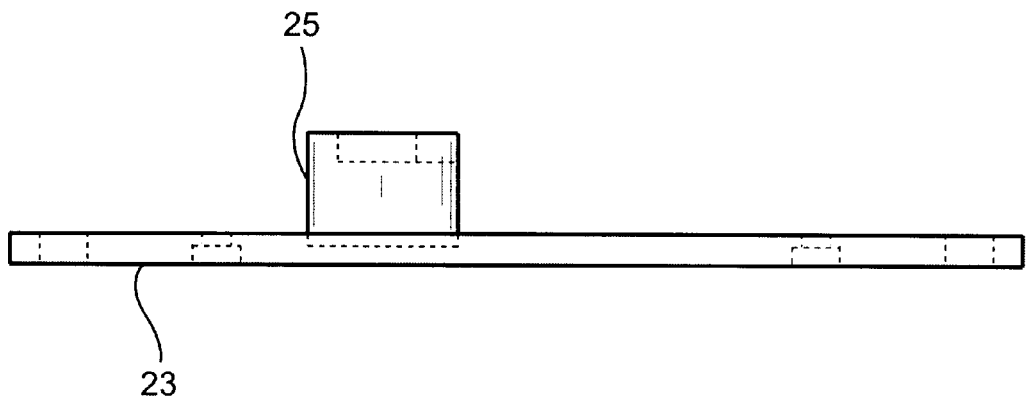

FIGS. 2–4 illustrate a preferred embodiment of the surge protector with a thermally activated shunt formed in accordance with the present invention. Referring to FIG. 2, a printed circuit board PCB 20 is illustrated with a conductive microstrip transmission line 10 interconnecting the center conductors of connectors 12 and 14. One conductive side 11 of the printed circuit board 20 defining the microstrip transmission line 10 is shown connected to the center conductors of the connectors 12 and 14, while the other conductive side 13 of the printed circuit board is connected to circuit ground and to the outer conductors of connectors 12 and 14.

The transmission line 10, defined by printed circuit board 20, is situated in a cavity 15 defined by a metallic housing 17. An electrically conductive block 19, preferably made of aluminum or other metal, is situated between and in contact with the inner wall of the housing and the other conductive side 13 of the printed circuit board 20, which forms a ground plane. The housing 17, block 19 and ground plane 13 are at circuit ground.

The housing 17 includes sidewalls 28 which are stepped inwardly at their lower edges to define a shoulder 21 (FIG. 2), and further includes inwardly extending tabs 30 at its four corners, each tab having a hole for receiving screws for securing the housing to a base plate 23. The base plate 23 forms a mounting plate, with associated holes in the four corners thereof for receiving mounting screws, for mounting the surge protector to a supporting structure. The structure of the outer base plate 23 is shown in greater detail in FIGS. 5, 7a and 7b, and 9a and 9b.

The surge protector of the present invention further includes a spacer 25 for receiving the gas discharge tube 16, as shown in FIGS. 4, 5, 8a and 8b and 9a and 9b. The spacer 25 is preferably mounted on the outer base plate 23 by press fitting and partially recessing it in the inner surface thereof. The spacer 25 is preferably cylindrical in form and solid throughout its body and made from a conductive material, such as brass or other metal. However, a portion of the top surface of the spacer 25 is recessed to form a receiving well 27 for partially receiving one end of the gas discharge tube 16. The spacer has a length which is selected so that the gas discharge tube is sandwiched between the top surface of the spacer 25 and the conductive side 11 of the printed circuit board 20. Stated another way, one terminal of the gas discharge tube 16 is electrically in contact with microstrip transmission line 10, and the other terminal of discharge tube 16 contacts spacer 25. Since spacer 25 is electrically conductive and in contact with base plate 23 and the rest of the housing, one side of the gas discharge tube 16 is at circuit ground.

A portion of the upper wall 29 defining the well 27 for receiving the end of the gas discharge tube 16 is preferably removed to the depth of the well to further accommodate receiving in the well of spacer 25 a cantilevered resilient spring member 24, as will be described in greater detail.

A thermally displaceable insulating layer 22 is applied to at least a portion of the exposed transmission line 10, i.e., mounted on the signal carrying conductive side 11 of the printed circuit board 20. The insulating material 22 is selected such that it maintains electrical insulation at temperatures below a threshold temperature, and melts away and is permanently displaced at temperatures exceeding a predetermined threshold temperature. One suitable material for use as the insulating material 22 is Mylar™.

Referring to FIG. 4, a preferred embodiment of the CSP of the present invention is illustrated. In this cross-sectional view, it can be seen that the gas discharge tube 16 resides in a cooperative relationship with an electrically and thermally conductive spring member 24. The spring member 24, illustrated in FIG. 3, is preferably formed from an electrically conductive and mechanically compliant material, such as beryllium copper or half-hardened brass. The spring member 24 has a fixed end 24a which is electrically connected to circuit ground and in thermal communication with the GDT 16. More preferably, fixed end 24a of spring member 24 is a flattened portion of member 24 which is wedged between and held in place by one end of gas discharge tube 16 and spacer 25 so that it resides in the bottom of the well 27 formed in spacer 25 and extends outwardly at an angle through the removed area of the upper sidewall 29 of spacer 25 and is directed toward the transmission line (i.e., printed circuit board 20) to where the meltable insulating material 22 is situated.

The spring member 24 further includes a free end 24b preferably configured in a "V" shape which, when assembled as shown in FIG. 4, is displaced and biased against the PCB 20 in alignment with the transmission line 10 and electrically insulating layer 22. The insulating layer 22 prevents electrical contact between the spring member 24 and transmission line 10 under normal signal conditions.

If a voltage or current surge occurs, the gas discharge tube 16 will normally handle such. The gas discharge tube 16 is normally in a first, substantially non-conductive state when no appreciable surge occurs, but switches to a second, conductive state when a surge occurs that exceeds a predetermined voltage level, such as 230 volts. The gas discharge tube 16 shorts the transmission line 10 (i.e., printed circuit board 20) to circuit ground to protect the electronic equipment, such as communications or telephony equipment, connected to the surge protector so that the voltage or current surge will not reach the electrical equipment. When the power surge ends, the gas discharge tube 16 will return to its normal, non-conductive state.

A situation may arise, however, where a continuous excessive voltage or current is applied to the surge protector, for example, where the communication line connected to the surge protector contacts, and remains in contact with, a high voltage power line. Under such conditions, the gas discharge tube 16, which is shorting transmission line 10 to circuit ground, may overheat and fail, becoming non-conductive, which leaves no protection to the electrical equipment connected to the surge protector.

In a continuous discharge condition as described, thermal energy from the gas discharge tube 16 is conducted along the spring member 24 and is presented to the electrically insulating layer 22. When the free end 24b of the spring member 24 reaches a predetermined temperature, the thermally displaceable insulating layer 22 melts and is displaced by the biasing force of the spring member 24. When the electrically insulating layer 22 is displaced, free end 24b of member 24 engages transmission line 10, and an electrical short circuit is presented from the transmission line 10 to circuit ground through the spring member 24. This effectively bypasses the gas discharge tube 16 and diverts current from tube 16 to the shunt formed by member 24 so that a major portion of the signal and surge voltage and current is conducted through the spring member 24 to circuit ground.

Because the spring member 24 is sized and shaped to provide both a low thermal and electrical resistance from the transmission line 10 to circuit ground, the risk of fire and the risk of equipment damage is permanently averted. Furthermore, the short provided by spring 24 is preferably permanent and non-reversible so that a unit which has experienced overheating must be replaced rather than automatically resetting itself to a non-shorted condition. A permanently shorted unit is preferred so that it can more easily be located by a service person and so that a unit, whose condition is questionable, will not remain in service.

Figure 10:
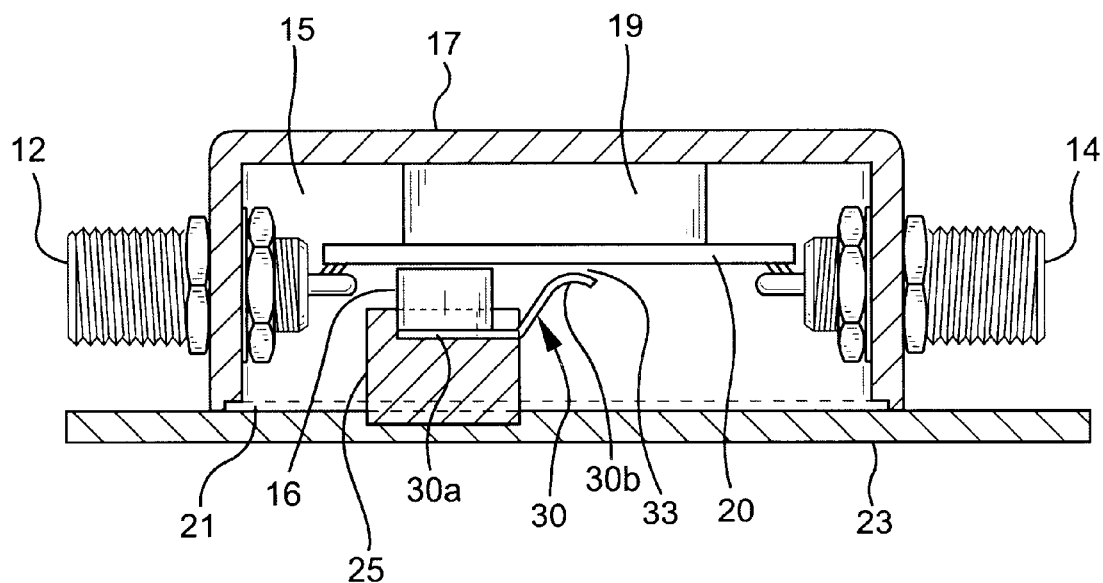
FIG. 10 is a cross-sectional view of an alternate embodiment of a coaxial surge protector formed in accordance with the present invention.
Figure 11:
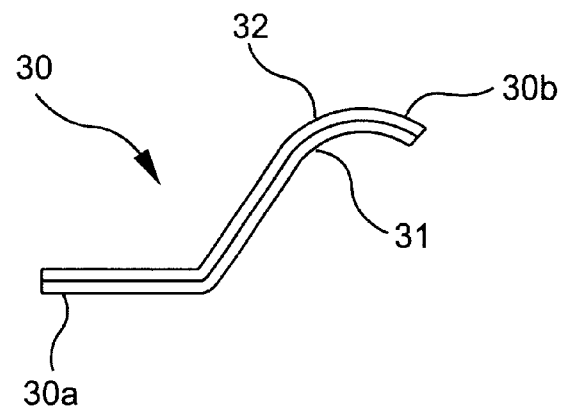
FIG. 11 is a cross-sectional view of an alternate embodiment of the conductive shunt formed in accordance with the present invention.

FIG. 10 shows an alternate embodiment of the coaxial surge protector of the present invention. The coaxial surge protector shown in FIG. 10 includes a thermally activated shunt comprising a bimetallic strip 30. The bimetallic strip 30 is made of two electrically conductive layers 31 and 32 laminated together with one of the layers 31 having a higher coefficient of thermal expansion than the other layer 32. As shown in FIGS. 10 and 11, the bimetallic strip 30 has a fixed end 30a which is electrically connected to circuit ground and in thermal communication with the GDT 16 as described above. The bimetallic strip 30 further includes a free end 30b preferably configured in the shape of an arc with the layer 32 having the lower coefficient of thermal expansion situated on the outer perimeter of the arc. The bimetallic strip 30 is assembled such that the outer perimeter of the arc, and thus the layer 32 having the lower coefficient of thermal expansion, faces the PCB 20 and defines a gap 33 therebetween as shown in FIG. 10.

In use, when a continuous excessive voltage or current is applied to the surge protector, the thermal energy from the gas discharge tube 16 is conducted along the bimetallic strip 30 causing the strip to expand. Because the layers 31 and 32 have different coefficients of thermal expansion, the layer 31 having the higher coefficient will expand at a greater rate thereby causing the arc shape of the free end 30b to straighten which in turn closes the gap 33 between the PCB 20 and the bimetallic strip 30. When the gap 33 is closed and contact is made between the PCB 20 and the bimetallic strip 30, an electrical short circuit is presented from the transmission line 10 to circuit ground through the bimetallic strip. This effectively bypasses the gas discharge tube 16 and diverts current from tube 16 to the shunt formed by strip 30 so that a major portion of the signal and surge voltage and current is conducted through the strip 30 to circuit ground as described above.

The surge protector of the present invention complies with the requirements set for in the publication "Generic Requirements for Surge Protectors on Coaxial Lines at Customer's Premises" published by Bellcore, GR-2908-CORE, Issue 1, December 1995. This publication was attached as an appendix to provisional application Ser. No. 60/048,447, described previously, and it is incorporated herein by reference.

Although illustrative embodiments of the present invention have been described herein with reference to the accompanying drawings, it is to be understood the invention is not limited to those precise embodiments, and that various other changes and modifications may be effected therein by one skilled in the art without departing from the scope or spirit of the invention.

What is claimed is:

1. A coaxial surge protector, which comprises:

a transmission line, the transmission line being in the form of a two-sided printed circuit board, the transmission line having associated therewith a circuit ground;

a housing defining an inner cavity, the transmission line being situated within the inner cavity of the housing and being coupled to circuit ground;

a signal input connector and a signal output connector, the signal input and output connectors being mounted on the housing, the transmission line being electrically coupled to the signal input and output connectors;

a surge suppressor element, the surge suppressor element being electrically coupled between the transmission line and circuit ground, the surge suppressor element being in a first, substantially non-conductive state when a voltage impressed thereacross is below a predetermined threshold voltage and a second, substantially conductive state when a voltage impressed thereacross is at least equal to a predetermined threshold voltage; and a thermally activated shunt assembly, the shunt assembly being thermally coupled to the surge suppressor element, the shunt assembly sensing when the surge suppressor element is in an overheated condition upon which the shunt assembly defines a substantially electrically conductive shunt in parallel with the surge suppressor element and between the transmission line and circuit ground, the shunt assembly being non-reversible and permanently changing state from a substantially open circuit to a substantially short circuit when an overheating condition with respect to the surge suppressor element is sensed.

2. A coaxial surge protector, which comprises:

a transmission line, the transmission line being in the form of a two-sided printed circuit board, the transmission line having associated therewith a circuit ground;

a housing defining an inner cavity, the transmission line being situated within the inner cavity of the housing and being coupled to circuit ground;

a signal input connector and a signal output connector, the signal input and output connectors being mounted on the housing, the transmission line being electrically coupled to the signal input and output connectors;

a surge suppressor element, the surge suppressor element being electrically coupled between the transmission line and circuit ground, the surge suppressor element being in a first, substantially non-conductive state when a voltage impressed thereacross is below a predetermined threshold voltage and a second, substantially conductive state when a voltage impressed thereacross is at least equal to a predetermined threshold voltage; and a bimetallic strip having first and second ends, the first end being thermally coupled to the surge suppressor element and being electrically coupled to the circuit ground and the second end being movable between a first position at a first temperature of the strip wherein the second end is spaced apart from one side of the printed circuit board and a second position at a second temperature of the strip wherein the second end is in contact with the printed circuit board thereby shunting the surge suppressor element when the surge suppressor element is in an overheated condition.

* * * * *